May 1, 1934.  J. CARTER  1,956,893
HYDRAULIC VARIABLE SPEED TRANSMISSION GEAR
Filed Nov. 4, 1932  2 Sheets-Sheet 1

John Carter
INVENTOR

BY C. A. Snow & Co.
ATTORNEYS

May 1, 1934.  J. CARTER  1,956,893
HYDRAULIC VARIABLE SPEED TRANSMISSION GEAR
Filed Nov. 4, 1932  2 Sheets-Sheet 2

John Carter
INVENTOR
BY CA Snow & Co.
ATTORNEYS

Patented May 1, 1934

1,956,893

UNITED STATES PATENT OFFICE 1,956,893

HYDRAULIC VARIABLE SPEED TRANSMISSION GEAR

John Carter, Farnborough, England

Application November 4, 1932, Serial No. 641,311
In Great Britain December 5, 1931

6 Claims. (Cl. 74—34)

This invention relates to certain novel improvements in hydraulic variable-speed transmission-gears, and has for its principal object the provision of an improved construction of this character which will be highly efficient in use and economical in manufacture.

It is the primary object of this invention to provide unique and effective means for obtaining any desired gear ratio between the driver and driven elements and which can be applied to any vehicle mechanically propelled, or engine, or machine where any kind of motive power is used.

The invention in its broadest aspect consists of an hydraulic variable speed gear comprising driver and driven elements, one of which carries any desired number of gear pumps operating to transmit motion to the other element. A feature of the invention resides in such transmission being obtained through oil or other fluid taken from a suitable source such as, in the case of oil, the lubricating circuit of the driving engine to keep a central chamber constantly filled and under pressure for the purpose of supplying the main fluid pumps.

The transmission gear can be used for the following purposes:—

A dynamometer, by measuring the power necessary to drive the transmission gear. A driving transmission for superchargers and blowers.

A vibration damper—due to the cushioning of the fluid on the teeth of the circulating pumps.

Referring to the drawings:—

Figure 1:
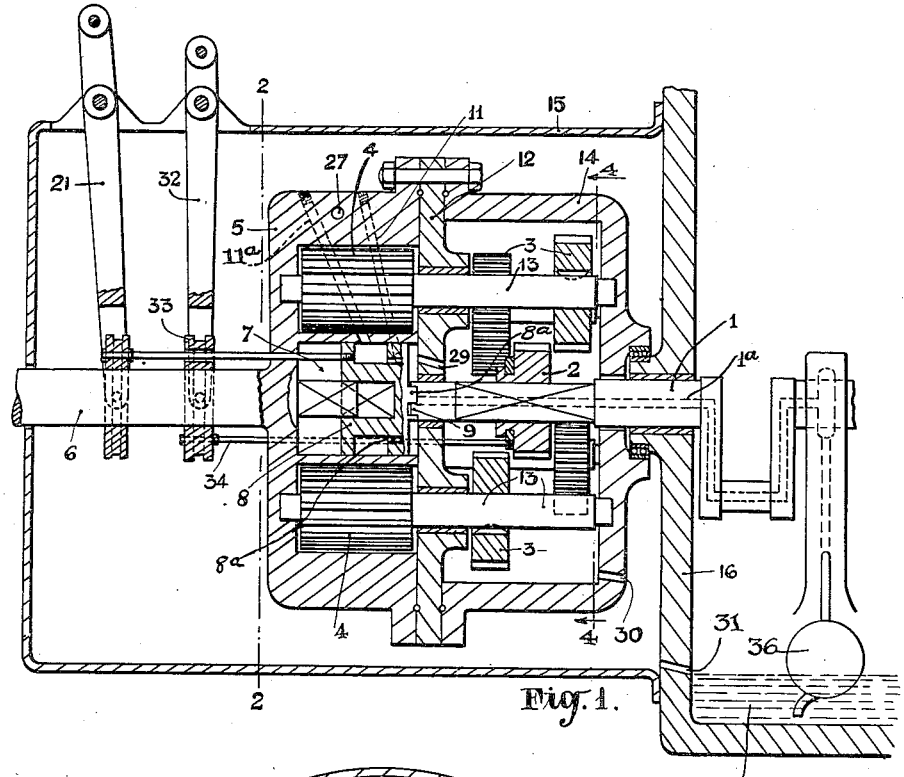
Figure 1 is a longitudinal axial section of a variable speed gear constructed according to this invention the section through the pump and gear housing being taken on line 1—1 of Figure 2.
Figure 2:
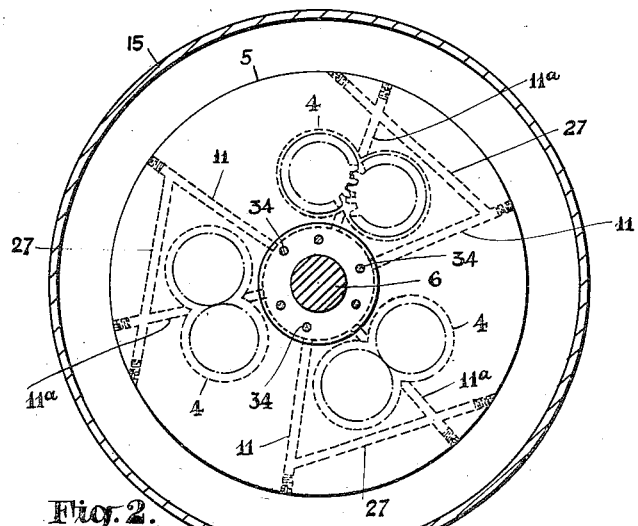
Figure 2 is a cross section taken on the line 2—2 of Figure 1.

In the transmission gear shown in Figures 1 and 2 the crankshaft 1 forming the driving unit drives a pinion wheel 2 which drives other pinion wheels 3 symmetrically arranged to drive the gear pumps 4. Coupled to the pump housing 5 of the driven unit is the driven shaft 6.

The central chamber 7 in the housing 5 which forms a fluid reservoir for the gear pumps 4 is supplied with oil under pressure from the engine circulating system by way of a passage 1a drilled in the crankshaft 1, the engine circulating system comprising the usual pump 36 which pumps oil from the engine sump 37 and delivers the same to the conduit 1a''. This latter inclusion is ordinary common knowledge, it being quite usual to pump oil through the crank shaft to bearings. A constant circulation is kept up by drilling a hole 29, in the central plate 12, which serves to fill the pinions cover 14 and lubricate the driving pinions 2 and 3 under pressure. The oil passes out of the cover 14 via a hole 30 and then through a hole 31 in the outer casing 15 into the crankcase, or to a cooler, or engine sump as the case may be, thus completing the circuit, and keeping the fluid at a constant temperature. The flow of fluid through the pumps is controlled by a piston valve 8, and when the valve 8 is in a central position, the discharge ports 11 are fully open and no resistance is offered and the pinions 3 can freely rotate. This is free engine position. When the ports 11 are fully closed the resistance is positive and the unit moves round at engine speed.

Between the two limits of no resistance and full resistance, the gear will drive the final driving or driven shaft 6 at varying speeds, from infinitely slow up to engine speed. The control valve 8 is operated by a lever 21 and can be set in any position between fully open and fully closed, the ports 11 being made of such a size that there is a certain amount of "automatic" action in the gear. Thus when the ports 11 are fully open and the engine is idling, no drive is transmitted, but if the engine is raced the drive will tend to pick up, in view of the fact that the size of the passages 27 will resist the increased flow of fluid.

The control is most effective in three positions i. e. "free", "normal", and "positive" the latter giving a direct rigid drive, when dogs 8a on the valve 8 and dogs 9 on the crankshaft 1 engage each other, after the fluid ports 11 have been shut off.

The valve 8 is shaped to fit and move along a splined squared or other shaped extension of the driven shaft 6. When reverse drive is desired the pinion 2, which has a control ring 2a on it, is moved on a splined, squared or other shaped extension of the crankshaft 1. The pinion 2 is controlled by a lever 32, which is coupled to the drum 33 slidably mounted on the shaft 6. Rods 34 are connected to the ring 2a, and pass back through the central plate 12 and pump housing 5 to be fixed to the drum 26.

The central plate 12 aforementioned forms a side cover for the gear pumps 4, and also carries the appropriate number of bearings for the pump shafts 13 which are extended to carry the driving pinions 3. Coupled to the pump housing 5 and central plate 12 at one end and running on a bearing on the crankshaft 1 at the other is a cover or casing 14 which forms an oil chamber for the driving pinions 2 and 3. On the extreme outside of the gear is a cover or outer casing 15 which encloses the whole of the working unit. This cover 15 is secured to the crankcase 16 at one end and runs on a ball and thrust bearing secured to the driven or final driving shaft 6 at the other.

The pump housing 5 has suitable passages 27 formed or drilled in same, which connect the inlet ports 11a and the discharge ports 11 to the central chamber 7. The gear pumps suck in through the ports 11a and drive the fluid through the passages 27 to the discharge ports 11. When the pinion 2 is in reverse, the flow of fluid is reversed as the arrangement of the passages 27 permit of this. Holes 8a are provided in the piston so that fluid can freely flow to and from the annular chamber of the piston valve whereby a continuous supply of fluid can be fed into or delivered from such annular chamber. If used for driving a blower or super-charger the arrangement as in Figure 1 can be used by attaching the blower to the driven or final driving shaft 6. Full engine power is obtainable when the blower or supercharger is not required—as in taking off with an aeroplane—the control valve 8 is left in the central position and no drive occurs. It is however possible to bring the blower or supercharger into use at any required moment by moving the valve 8 across the ports 11 by means of the controlling lever 21.

As the fluid in the gear pumps 4 is under pressure a fluid engine vibration damper is effected owing to fluid cushioning between the teeth of the gear pumps 4. The effectiveness of its damping action may easily be adjusted by moving the piston valve 8 across the discharge ports 11 thus preventing what is known as an engine resonance or vibration period.

Figure 3:
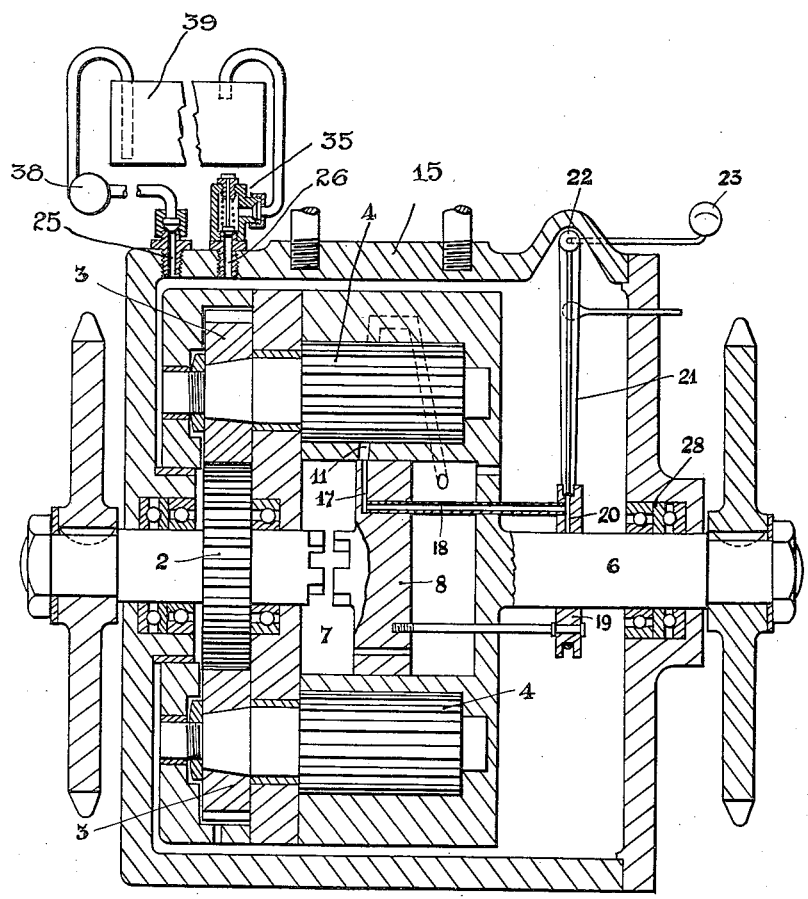
Figure 3 is a longitudinal sectional view of a modified form of the invention which constitutes an independent unit and Figure 4 is a section on line 4—4 of Figure 1.
Figure 4:
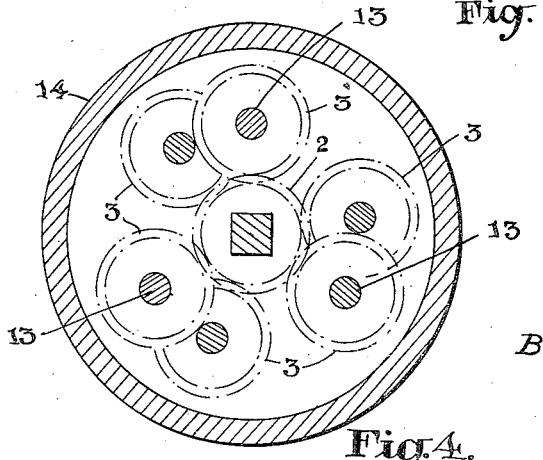

The transmission gear can be used as a fluid dynamometer by drilling and tapping the fulcrum pin 22 to receive a gauge 23 to which is applied fluid under pressure, as shown in Figure 3. The pressure at which the fluid is supplied to the transmission gear varies as the speed—and consequently the power output—of the driving element, and so by calibrating the horse power and corresponding revolutions of the engine, as well as the oil pressure on the pressure gauge, the transmission gear serves as a fluid dynamometer.

Figure 3 is a modification in the form of an independent unit, a sprocket wheel being employed as the driver element. The operation of the unit is similar to that described according to Figure 1 and 2. In this form however the pinion 2 is not slideable as no provision for reverse drive is required.

The discharge ports 11 leading into the central chamber 7 are controlled by the piston valve 8. In the piston valve 8 is a passage 17 which communicates with the ports 11 at one end, and at the other end with a hole 18 drilled in the rod connecting the piston valve 8 and the sliding control drum 19. In the drum 19 is a hole 20 which lubricates the final driving shaft 6, a ball and thrust bearing 28 being fitted to this shaft. A pipe rigid with the lever 21 leads the fluid to the fulcrum pin 22 and when the transmission gear is used as a dynamometer a guage 23 is fitted by drilling and tapping a hole in the fulcrum pin 22.

Fluid pressure, horse power and engine revolutions can then be read from the gauge 23.

A hole 25 is drilled in the outer cover 15 through which the fluid is supplied by tapping the lubrication system 38 of the driver element. A smaller hole 26 which has a release valve 35 is drilled in the outer cover 15 thus keeping the fluid in circulation and under pressure. The surplus oil is then returned to a cooler or to the sump 39 of the driver element.

I claim:

1. A hydraulic variable speed transmission gear, comprising a driving element, a driven element, a central chamber in the driven element, means for forcing fluid into said chamber from an outside source of supply so that it is constantly filled with liquid under pressure and for leading the fluid supplied to the transmission gear back to the source of supply to obtain a circulation of fluid, a plurality of gear pumps in the driven element symmetrically around the central chamber, gear wheels for driving the pumps from the driving element, conduits leading from the central chamber to one side of the gear pumps, and conduits leading from the other side of the gear pumps back to the central chamber so that the pumps suck from and discharge thereinto when running in either direction, and a valve mounted in the central chamber for controlling the flow of fluid through the conduits discharging from the gear pumps.

2. A hydraulic variable speed transmission gear, comprising a driving element, a driven element, a central chamber in the driven element, a fluid conduit leading to the central chamber to maintain such chamber constantly filled with fluid under pressure, a plurality of gear pumps in the driven element symmetrically around the central chamber, gear wheels for driving the pumps from the driving element, conduits leading from the central chamber to one side of the gear pumps, and conduits leading from the other side of the gear pumps back to the central chamber so that the pumps suck from and discharge thereinto when running in either direction, and a valve mounted in the central chamber for controlling the flow of fluid through the conduits discharging from the gear pumps, a fluid sump, a pump for delivering fluid through the conduit leading to the central chamber from the fluid sump and means for returning the fluid to said sump.

3. A hydraulic variable speed transmission gear, comprising a driving element, a driven element, a central chamber in the driven element, means for forcing fluid into said chamber from an outside source of supply so that it is constantly filled with liquid under pressure and for leading the fluid supplied to the transmission gear back to the source of supply to obtain a circulation of fluid, a plurality of gear pumps in the driven element arranged symmetrically around the central chamber, gear wheels for driving the pumps from the driving element, conduits leading from the central chamber to one side of the gear pumps, and conduits leading from the other side of the gear pumps back to the central chamber so that the pumps suck from and discharge thereinto when running in either direction, and a piston valve mounted in the chamber for controlling the discharge conduits, and means whereby the piston valve is adapted to lock the driving and driven elements together when the said discharge conduits are closed.

4. A hydraulic variable speed transmission gear, comprising a driving shaft, a driven element, a central chamber in the driven element, means for forcing fluid into said chamber from an outside source of supply so that it is constantly filled with liquid under pressure and for leading the fluid supplied to the transmission gear back to the source of supply to obtain a circulation of fluid, a plurality of gear pumps mounted on spindles in the driven element arranged symmetrically around the central chamber which suck from and discharge into such chamber, gear wheels for driving the pumps from the driving element, conduits leading from the central chamber to one side of the gear pumps, and conduits leading from the other side of the gear pumps back to the central chamber so that the pumps suck from and discharge thereinto when running in either direction, a valve mounted in the central chamber for controlling the flow of fluid through the conduits discharging from the pumps, means for obtaining a forward and reverse drive comprising a driving pinion slidably and nonrotatably mounted on the driving shaft, a pinion mounted respectively on one spindle of each pair of gear pump spindles with which the driving pinion is engaged to drive the gear pumps to obtain a forward drive, and a second pinion mounted respectively on the other spindle of each pair of gear pump spindles with which the said driving pinion is engaged to give a reverse drive.

5. A hydraulic variable speed transmission gear, comprising a driving shaft, a driven element, comprising a housing forming a central chamber; means for forcing fluid into said chamber from an outside source of supply so that it is constantly filled with liquid under pressure and for leading the fluid supplied to the transmission gear back to the source of supply to obtain a circulation of fluid, recesses in the housing concentrically arranged around the central chamber and forming gear pump chambers, gear pumps mounted therein, passages in the wall of the housing to enable the pumps to suck oil from and discharge into the central chamber, a valve for opening or closing the discharge passages leading to the central chamber, gear wheels for driving the pumps from the driving shaft, a compartment at the side of the said housing enclosing the said gear wheels, a dividing wall between the pumps and the latter compartment, and a passage permitting oil to flow under pressure from the said central chamber into the latter gear enclosing compartment, and a conduit leading from the latter compartment so that the fluid can circulate through the central chamber and the said gear enclosing compartment back to the source of supply.

6. A hydraulic variable speed transmission gear, comprising a driving shaft, a driven element, comprising a housing forming a central chamber; means for forcing fluid into said chamber from an outside source of supply so that it is constantly filled with liquid under pressure and for leading the fluid supplied to the transmission gear back to the source of supply to obtain a circulation of fluid, recesses in the housing concentrically arranged around the central chamber and forming gear pump chambers, gear pumps mounted therein, passages in the wall of the housing to enable the pumps to suck oil from and discharge into the central chamber, a valve for opening or closing the discharge passages leading to the central chamber, gear wheels for driving the pumps from the driving shaft, a compartment at the side of the said housing enclosing the said gear wheels, a dividing wall between the pumps and the latter compartment, a conduit passing through the driving shaft for filling the central chamber with fluid under pressure, a compartment on the driven element enclosing gears driving the gear pumps from the driving element, a conduit delivering oil from the central chamber to the compartment enclosing the gears and an outlet in the latter compartment for allowing the fluid to pass therefrom back to the source of supply.

JOHN CARTER.